United States Patent
Hager (10) Patent No.: US 10,256,702 B2
(45) Date of Patent: Apr. 9, 2019

(54) TRANSDUCER DEVICE WITH FORM-FITTING CONNECTION

(71) Applicant: Bühler Motor GmbH, Nürnberg (DE)

(72) Inventor: Ludwig Hager, Nürnberg (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 825 days.

(21) Appl. No.: 14/933,131

(22) Filed: Nov. 5, 2015

(65) Prior Publication Data
US 2016/0141940 A1 May 19, 2016

(30) Foreign Application Priority Data
Nov. 18, 2014 (DE) .......... 10 2014 223 513

(51) Int. Cl.
| F16D 1/108 | (2006.01) |
| H02K 11/215 | (2016.01) |
| G01D 5/244 | (2006.01) |
| G01P 3/487 | (2006.01) |
| G01D 5/14 | (2006.01) |
| H02K 11/21 | (2016.01) |
| G01P 1/02 | (2006.01) |
| F16B 17/00 | (2006.01) |

(52) U.S. Cl.
CPC .......... H02K 11/215 (2016.01); G01D 5/145 (2013.01); G01D 5/244 (2013.01); G01P 1/026 (2013.01); G01P 3/487 (2013.01); H02K 11/21 (2016.01); F16B 17/004 (2013.01)

(58) Field of Classification Search
CPC ........ H02K 11/00; F16C 35/063; F16D 1/108
See application file for complete search history.

(56) References Cited

U.S. PATENT DOCUMENTS

| 1,975,244 | A | * | 10/1934 | Wiseman | F16B 7/22 16/DIG. 41 |
| 2,348,071 | A | * | 5/1944 | Johnstone | F16D 1/02 403/305 |
| 3,489,987 | A | * | 1/1970 | Niskin | H01R 13/523 338/214 |
| 3,814,529 | A | * | 6/1974 | Caperton | F16B 7/22 403/393 |
| 5,098,216 | A | * | 3/1992 | Caperton | F16B 7/22 403/286 |
| 5,125,848 | A | * | 6/1992 | Zimmerly | H01R 13/5213 439/287 |
| 5,143,477 | A | * | 9/1992 | Kanehira | F01D 5/02 403/341 |
| 6,217,251 | B1 | * | 4/2001 | Kato | F16B 17/004 403/341 |
| 7,847,446 | B2 | * | 12/2010 | Becker | F16D 1/0835 310/68 B |
| 9,637,924 | B2 | * | 5/2017 | Comerford | E04C 5/165 |
| 2011/0260718 | A1 | * | 10/2011 | Himing | G01D 11/16 324/207.25 |

* cited by examiner

Primary Examiner — Daniel J Wiley
(74) Attorney, Agent, or Firm — Westerman, Hattori, Daniels & Adrian, LLP (57) ABSTRACT

A transducer device for attachment to one end of a shaft of an electric drive, the shaft having a shaft axis. The transducer device includes at least one recess in the shaft end. Means are provided for engaging the transducer device with the at least one recess to create a form fitting connection acting in the direction of the shaft axis. Finally, a securing means is provided for preventing detachment of the form-fitting connection.

16 Claims, 6 Drawing Sheets

TRANSDUCER DEVICE WITH FORM-FITTING CONNECTION

BACKGROUND OF THE INVENTION

1. Field of the Invention

The invention concerns a transducer device for attachment to one end of a shaft of an electric drive. A "transducer device" describes a transducer or an assembly consisting of a support or carrier part and a transducer.

2. Description of Related Art Including Information Disclosed under 37 CFR 1.97 and 1.98

It is known, for example, to glue magnetic transducer elements directly onto shaft ends or grooves in the shaft ends. This mounting option includes the risk of unwanted loosening of the adhesive bond, especially in the case of pump motors, e.g., oil pump motors filled with aggressive agents. In this case, associated sensor devices are usually separated from the sensor magnet through a sealed wall. Thus, wall thickness and clearance between a sensor magnet and a partition add up, thereby significantly limiting signal strength. In addition, routing field lines through the directly adjacent shaft weakens the field. It is therefore necessary to move the sensor transducer away from the shaft and bring it as close as possible to the partition without enlarging the structural space.

From U.S. Pat. No. 7,847,446 a generic transducer device is known, which is designed in the form of a magnet assembly. For securing the magnet assembly on the shaft, a magnet holder manufactured through injection molding and a magnetic element are used. The magnet holder and the magnetic elements are initially designed as separate components. In the assembled state, the magnetic element is injected into the plastic material of the magnet holder and the magnet holder connected to the shaft. Attachment is realized through a resilient tolerance ring, which is disposed in an insertion groove of the magnet holder. The magnet assembly increases the diameter of the shaft, thereby requiring more space. The additional spring element increases the number of parts required and complicates assembly. There is only a frictional connection between the shaft and the magnet assembly.

The problem addressed by the invention is therefore that of providing a generic transducer device which is particularly simple in design, reduces the number of parts and permits a particularly easy and secure assembly, thereby facilitating a captive and rotationally fixed connection.

SUMMARY OF THE INVENTION

According to the invention, the transducer device is for attachment to one end of an elongated shaft of an electric drive, the shaft having a longitudinal axis. The shaft end has at least one recess in which the transducer device engages, whereby a form-fitting connection acting at least in the direction of a shaft axis is formed and a bearing of the electric drive is used as a securing means against detachment of the form-fitting connection. Since the bearing is provided in any case, no additional component is required for securing the transducer device. In addition, structural space within the bearing can be used for this purpose.

Since the transducer device has, at least in areas, a cylindrical outer contour which corresponds at least approximately to the outer diameter of the shaft and extends at least partly into a cylindrical inner section of the bearing, the structural space does not increase radially.

In a first embodiment, the recess at the shaft end is realized as a transverse groove oriented perpendicularly and transverse to the longitudinal direction of the shaft, wherein a rib remaining between the transverse groove and an adjacent shaft front end relative to the inner contour of the bearing springs back and the space section obtained thereby is captured by the transducer device. In this solution, the transducer device is pushed, during assembly, perpendicularly to the shaft longitudinal direction (axial direction) and form-fittingly connected with the shaft. Preferably, the shaft end has two parallel transverse grooves perpendicular to the longitudinal direction of the shaft.

The transducer device has a counter-contour corresponding to the shaft end and is pushed radially to the shaft axis onto the shaft end, wherein the bearing prevents a lateral/radial deflection of the transducer device from the shaft. In this way, a robust form-fitting connection is formed in both the axial and radial directions, which is secure even under difficult conditions.

According to a preferred first variant of the first embodiment of the invention, the transducer device consists of a support part and a transducer part, wherein the support part engages in the form-fitting connection with the shaft.

The transducer part is mounted between the shaft end and a section of the support part. In this way, the transducer part is form-fittingly connected to the shaft.

Should deep connection be made between the transducer part and the support part, it is expedient, according to a second variant of the first embodiment, to join the transducer part to the support part through primary shaping. In this case, the transducer part can be either a plastic-bonded magnet as well as a commercially available magnetic pill, which is composed for example of ferrite or a rare earth material such as NdFeB (Neodymium).

A particularly simple solution has been found in the limn of a third variant of the first embodiment, according to which the transducer device is formed as one piece and performs both the functions of the sensor part as well of the support part. In this case, the transducer device consists of a plastic-bonded permanent magnet.

In a fourth variant of the first embodiment, the transducer device is manufactured by a two-component injection molding process and comprises magnet-free sections in the support part and magnetic-material-containing sections in the transducer part. This variant is particularly recommended when using rare earth materials.

A fifth variant is characterized in that the shaft end has a polygonal grooved contour, wherein ribs remaining between the grooves and an adjacent shaft front end spring back against the inner contour of the bearing and the space section thereby gained is captured by the transducer device. This solution allows different mounting positions of the transducer device, and thus different magnetic orientations of the transducer device relative to the rotor.

In a sixth variant, snap hook-like means are attached to the transducer device, which engage in the groove or in the grooves, wherein the snap means are secured from coming loose by the bearing. This allows the transducer device also to be mounted axially. The mentioned variants can be partly combined with each other.

A second embodiment of the invention is characterized by a film hinge, which constitutes a single piece with at least two partial transducer devices. The film hinge allows simple production of a virtually two-part housing (sub-carrier parts) for receiving the transducer part, wherein the two sub-carrier parts are initially open for receiving the transducer part and form-fittingly engage the transducer part when the film hinge is folded around and bent. Opening of the sub-carrier parts is prevented by the bearings partly surrounding the transducer device.

In one refinement of the invention, the transducer part and the support part are provided with protrusions or recesses which engage one another and jointly form a non-rotatable connection.

So that a majority of the magnetic field lines do not inn via the shaft, but other via a sensor, a spacer is provided in the transducer device, which ensures a distance between the transducer part and the shaft end.

A second solution of the invention is that the shaft end has at least one recess in which the transducer device engages, whereby a form-fitting connection is formed acting at least in the direction of a shaft axis, and that a snap or clamping device of the transducer device serves as a securing means against the loosening of the form-fitting connection. In this case, no bearing is required as securing means, because the snap ensures a sufficiently secure connection through suitable design. In this case, the snap can be designed analogously to the housing snap, wherein a plurality of snaps are arranged at the edge of two opposite housing halves.

In the second solution, a film hinge is also preferably provided, which constitutes a single piece with at least two carrier parts. The film hinge runs perpendicular to the shaft axis but also axially parallel.

Additionally, an anti-rotation lock is provided, which engages form-fittingly with a counter contour, in particular a flattening of the shaft. In this way, a secure mechanical connection is provided in all spatial directions and in the direction of rotation.

BRIEF DESCRIPTION OF THE DRAWINGS

Embodiments of the invention are described with reference being made to the drawing. Shown are.

Numerals with an apostrophe and corresponding reference minerals without an apostrophe denote identically named details in the drawings and the description of the drawing. This indicates that the detail is used in another embodiment, the prior art and/or the detail is a variant. For the sake of convenience, the claims, the introductory description, the list of reference numerals and the summary contain only numerals without apostrophes.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1:
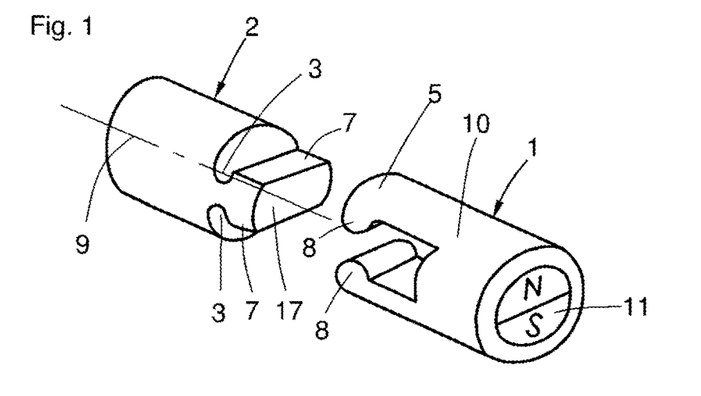
FIG. 1 shows a first embodiment of a transducer device and a shaft.

FIG. 1 shows a first embodiment of the inventive transducer device 1 and a shaft 2, wherein shaft 2 has two parallel recesses 3, which are oriented perpendicularly to the shaft axis 9 of shaft 2. An area between the recesses 3 and the shaft end 17 forms ribs 7, which are flattened, so that space is available for the transducer device 1. The transducer device is adapted to the diameter of the shaft 2 and to the contour of the recesses 3 in which they can engage with complementary counter-contours 8. The transducer device comprises a transducer part 11 and a support part 10. The transducer part 11 comprises a two-pole permanent magnet. High pin transducer parts 11 are possible. The ribs 7 form anti-rotation locks with corresponding mating surfaces of the transducer device 1 relative to the shaft 2. The transducer device 1 can be pushed radially onto the shaft.

Figure 2:
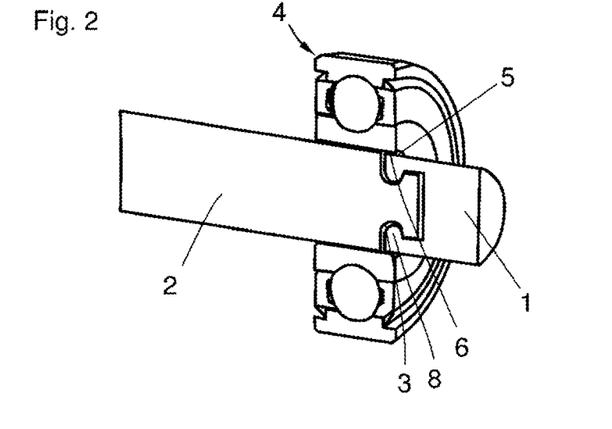
FIG. 2 is a sectional view of the first embodiment in an assembled state.

FIG. 2 shows a sectional view of the first embodiment in an assembled state, with the transducer device 1, the shaft 2 and a bearing 4 herein formed as ball bearings. The transducer device 1 engages the recesses 3 via the counter-contours 8. The transducer device 1 cannot be disassembled from its side, because an inner region of the bearing 4 surrounds and includes the shaft 2 and the transducer device 1. The bearing 4 is press-fitted onto the shaft 2.

Figure 3:
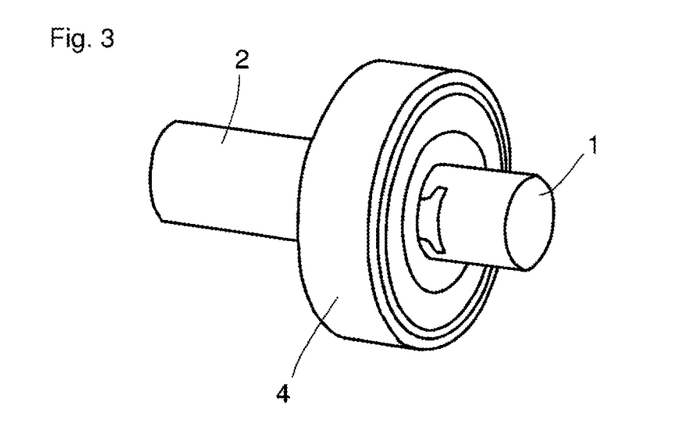
FIG. 3 is a perspective representation of the first embodiment in assembled state.

FIG. 3 shows a 3-D representation of the first embodiment with the transducer device 1, the shaft 2 and the bearing 4 in an assembled state where the transducer device 1 is mounted on the shaft 2 and held in place by the bearing 4.

Figure 4:
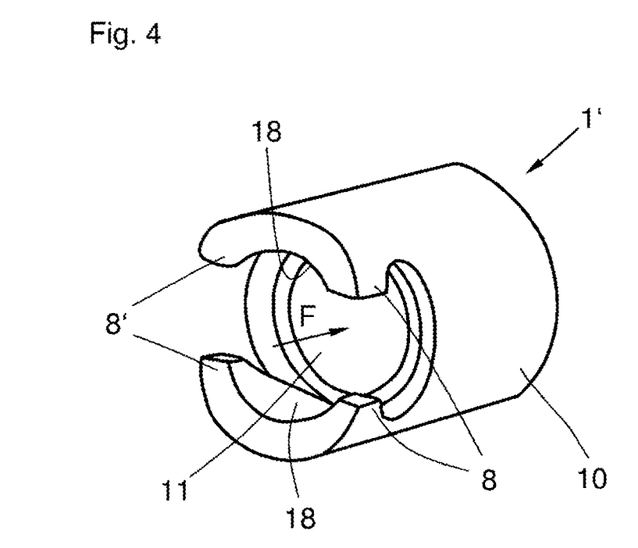
FIG. 4 is a variant of the transducer device of the first embodiment.

FIG. 4 is a variant of the transducer device 1' of the first embodiment, wherein the counter-contours 8' are not continuously rib-shaped, but have cylinder segment-shaped recesses 18, these serving as a mounting opening for the transducer part 11, which is mounted from the inside (see arrow F) of the support plate 10.

Figure 5:
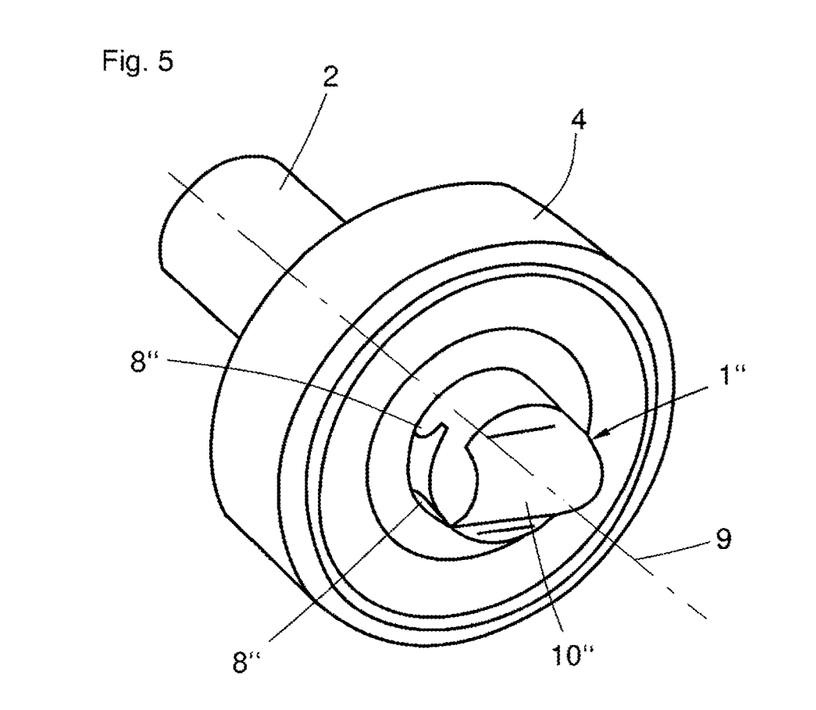
FIG. 5 shows a valiant with a transverse magnetic pill.

FIG. 5 shows a variant with a transverse magnetic pill (transducer part), which defines the outer contour of the transducer device 1". The basic form of the transducer part 11" is cylindrical and its axis is aligned at right angles with the longitudinal axis 9 of the shaft 2. In an assembled state, the transducer device 1", in particular the carrier part 10", is mounted on the counter-contours 8" on the shaft 2 and secured by the bearing 4.

Figure 6:
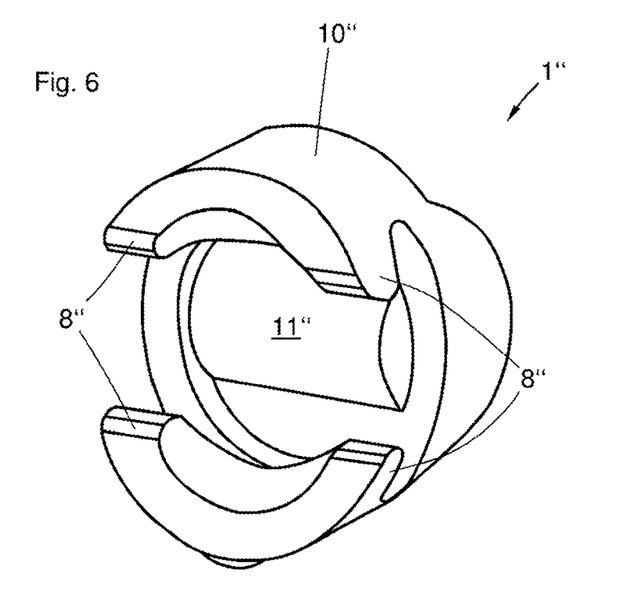
FIG. 6 is a further illustration of the transverse magnetic pill, FIG. 7 a second embodiment of the invention.

A further illustration of the transverse magnetic pill (transducer part 11") in the transducer device 1" is shown in FIG. 6. Additionally, the counter-contours 8" for the form-fitting connection with the shaft are clearly visible.

Figure 7:
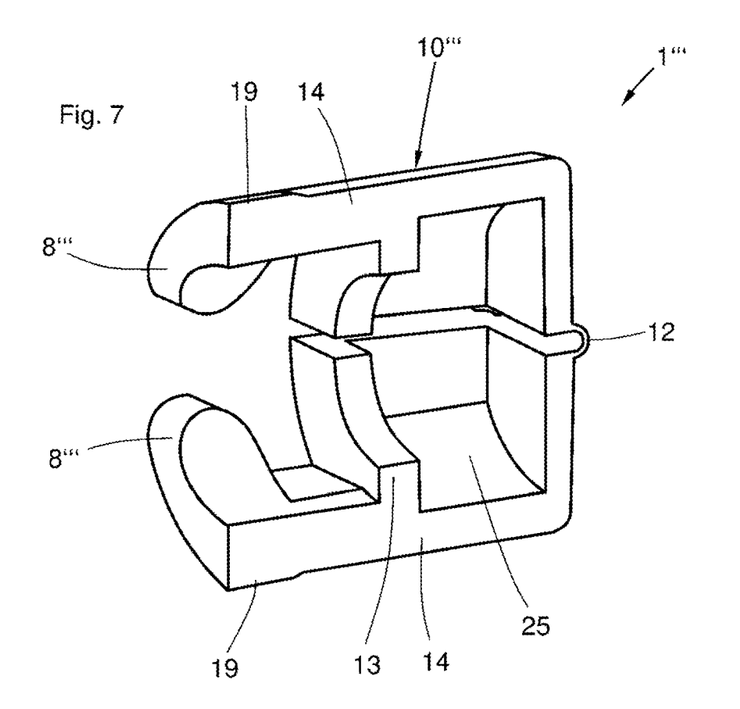

FIG. 7 shows a second embodiment of the invention in which the support or carrier part 10'" is comprised of two sub-carrier parts 14, which constitute a single piece with one another by being joined through a film hinge 12. An inner space 25 is cylindrically shaped to accommodate a cylindrical transducer part, the axial directions of the shaft and transducer part lying on the same straight line in this case. Near the shaft, the interior space is limited by a spacing structure 13. This creates a distance between the transducer part and the shaft end of the shaft 2. The counter-contours 8''' are used to create a form-fitting engagement with the shaft. The carrier part 10''' has extensions 19 at the outer circumference, which interact with the interior section of a bearing (See FIG. 12).

Figure 8:
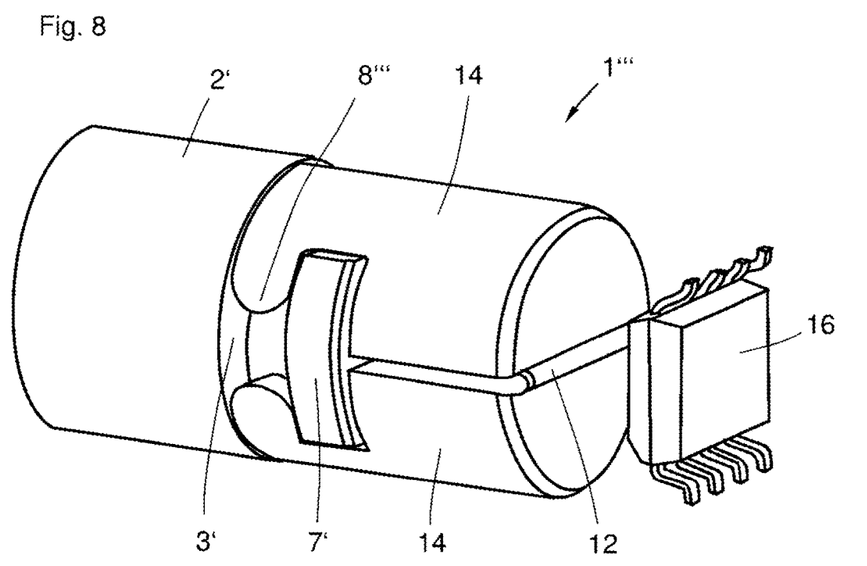
FIG. 8 is a perspective view of the second embodiment in assembled state.

FIG. 8 shows the second embodiment in assembled state, with a shaft 2', a recess 3' and a rib 7'. The counter-contours 8'' of the transducer device 1''' engage in the recess 3' and are held axially by the rib 7'.

Figure 10:
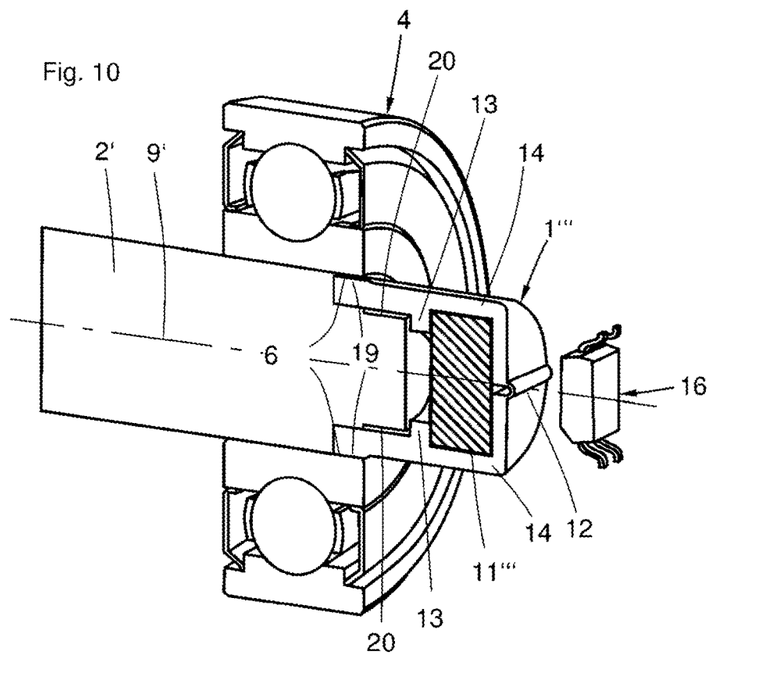
FIG. 10 is a sectional view of the second embodiment.

The sub-carriers 14 are held together by the film hinge 12 on the one hand and are secured through the inner section of a bearing on the other hand (see FIG. 10). Finally, a sensor 16 is shown from the front in its installed position frontally in relation to the transducer device 1'''.

Figure 9:
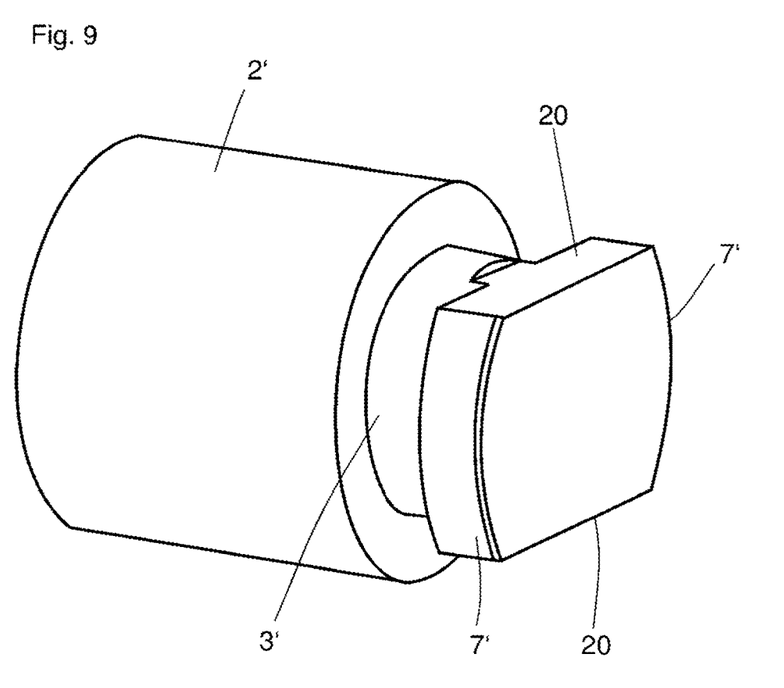
FIG. 9 is a perspective view of a shaft for use in the second embodiment.

FIG. 9 shows the shaft 2' for use in the second embodiment, with the recess 3' and the ribs 7'. Between the ribs 7' are flattened areas 20, which serve as a free space for the sub-carriers 14.

FIG. 10 shows a sectional view of the second embodiment, with the shaft 2', the bearing 4, which is embodied here as a ball bearing, the transducer device 1''', a transducer part 11''' (shaded area), the spacing means 13, the film hinge 12, the flattened areas 20, the inner portion 6 of the bearing 4, which is formed as an axial section of the inner ring of the ball bearing, the extensions 19 and the sub-carrier means 14. Again, the sensor 16 is shown in its assembled position frontally in relation to the transducer device 1''' on the axis 9' of the shaft 2'.

Figure 11:
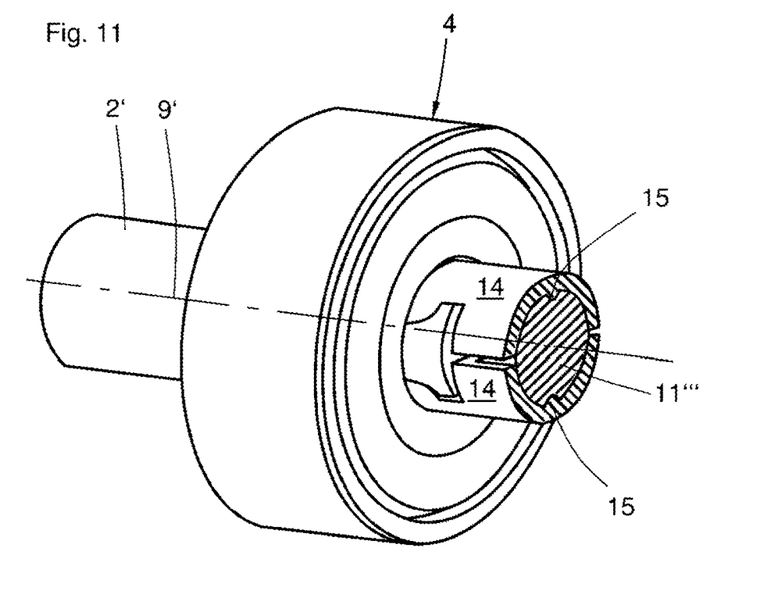
FIG. 11 is a second sectional view of the second embodiment.

FIG. 11 shows a second sectional view of the second embodiment, wherein the section is aligned at right angles to the motor axis 9' and extends through the section of transducer device 11'''. The cross-section shows the anti-rotation locks 15, which are formed as projections in the sub-carriers 14 and as recesses in the transducer device 11''', wherein projections engage in the recesses. Further, the bearing 4 is shown, which serves as a securing means.

Figure 12:
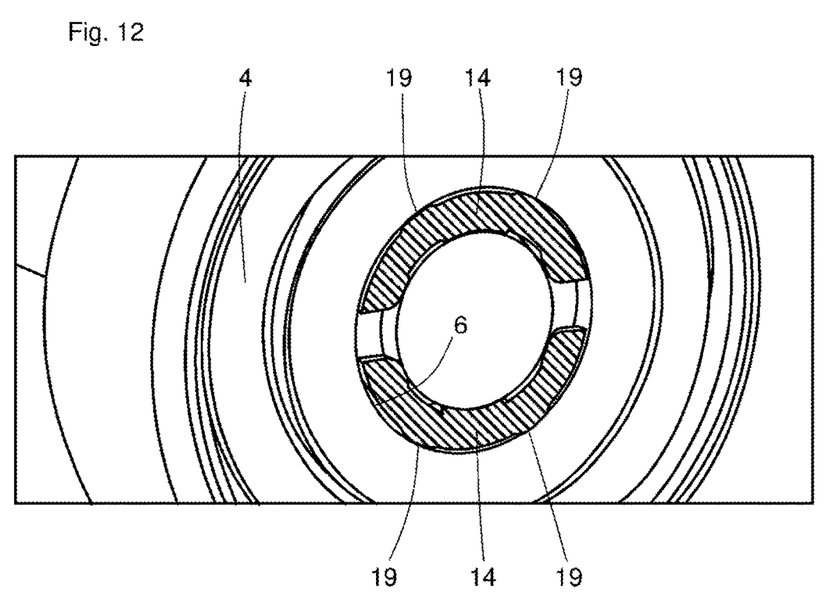
FIG. 12 is a third sectional view of the second embodiment.

FIG. 12 shows a third sectional view of the second embodiment, the section also being aligned at a right angle to the motor axis, but extending here at the end region of the bearing 4. Clearly visible here are the extensions 19 of the sub-carrier means 14, which interact with the inner section 6 of the bearing 4.

Figure 13:
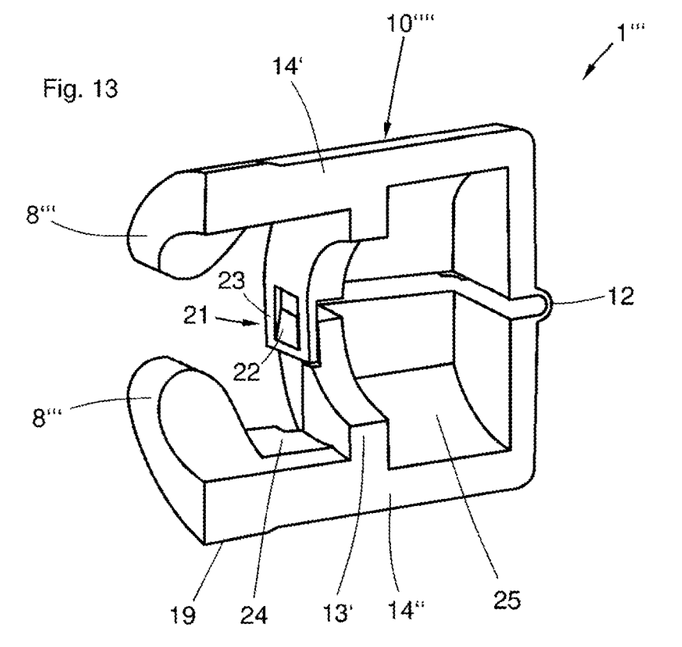
FIG. 13 is a variant of the second embodiment.

FIG. 13 shows a variant of the second embodiment of the invention, wherein the support member 10'''' comprises two sub-carrier means 14' and 14'', which constitute a single piece with one another through a film binge 12. An inner section 25 is cylindrically shaped to accommodate a cylindrical transducer part, wherein the axial directions of the shaft 2 and transducer part lie on the same straight line in this case. Near the shaft, the interior section is limited by a spacing section 13'. This causes a distance between the transducer part and the shaft end of the shaft. The counter-contours 8''' are used to create a form-fitting engagement with the shaft in the axial direction. The carrier part 10'''' has extensions 19 on the outer circumference, which can interact with the interior region (not shown here) of a bearing (See FIG. 12). As in FIG. 7, a snap 21 is shown here that consists of a snap hook 22 and a snap lug 23 which are free of undercuts produced by injection molding. To this end, the snap lug 23 is famed at a slight angle in a known manner and adapted to the snap hook 22 accordingly.

FIG. 13 also shows an example of a second solution of the invention, in which it is not necessary to use a bearing as a securing means, because the snap 21 ensures a sufficiently secure connection through the mating of the snap hook 22 and the snap lug 23.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMERALS 1 transducer device
2 shaft
3 recess
4 bearing
5 outer contour
6 inner section
7 rib
8 counter-contour
9 shaft axis
10 support part
11 transducer device
12 film hinge
13 spacing means
14 part carrier means
15 anti-rotation lock
16 sensor
17 shaft end
18 recess
19 extension
20 flattened area
21 snap means
22 snap hook
23 snap lug
24 anti-rotation means
25 inner section

What is claimed is:

1. A transducer device for attachment to one end of an elongated shaft of an electric drive, the shaft having a longitudinal axis, the transducer device comprising:
   a recess defined at the shaft end to provide a first securing means;
   a support part mounted to the transducer device, and having a second securing means;
   the second securing means engaging the recess of the first securing means whereby a form-fitting connection acting at least in the direction of the shaft axis is formed; and
   a ball bearing securing the shaft to the support part about the engaged first and second securing means to prevent detachment of the form-fitting connection.

2. The transducer device according to claim 1, wherein the bearing has a cylindrical inner section; and
   wherein the support part has a cylindrical outer contour which corresponds at least approximately to an outer diameter of the shaft and extends at least partly into the cylindrical inner section of the bearing.

3. The transducer device according to claim 1, wherein the recess at the shaft end comprises:
   a first transverse groove oriented perpendicularly to the longitudinal axis of the shaft; and
   a rib remaining between the transverse groove and the shaft end opposite to an inner contour of the bearing.

4. The transducer device according to claim 3, wherein the shaft end has a second transverse groove perpendicular to the longitudinal axis of the shaft, the first and second transverse grooves being parallel to each other.

5. The transducer device according to claim 4, further comprising: snap hook means which engage in the groove or in the grooves, wherein the snap hook means are seemed from coming loose by the bearing.

6. The transducer device according to claim 3, wherein the second securing means has a counter-contour corresponding to the recess at the shaft end and is pushed onto the shaft end radially to the shaft axis, and wherein the bearing prevents a lateral deflection of the support part off the shaft.

7. The transducer device according to claim 1, further comprising a transducer part mounted to the support part, the support part entering into the form-fitting connection with the shaft.

8. The transducer device according to claim 7, wherein the transducer part is a plastic-bonded permanent magnet.

9. The transducer device according to claim 1, wherein the transducer part is mounted between the shaft end and a section of the support part.

10. The transducer device according to claim 1, wherein the transducer part is joined to the support part through primary shaping.

11. The transducer device according to claim 1, wherein the support part includes a sensor part that enters the form-fitting connection with the shaft.

12. The transducer device according to claim 1, wherein the shaft end has a polygonal grooved contour, wherein ribs remaining between the grooves and an adjacent shaft front end spring backwards with respect to an inner contour of the bearing and the space area thereby obtained is captured by the transducer device.

13. The transducer device according to claim 1, wherein the support part includes at least two part carriers and the transducer device further comprising:

a film hinge which is integral with the at least two part carriers.

14. The transducer device according to claim 13, further comprising: securing means for securing the at least two part carriers in a mounted position.

15. The transducer device according to claim 1, further comprising: an anti-rotation lock between the support part and the transducer part.

16. The transducer device according to claim 1, further comprising: spacing means, for ensuring a distance between the transducer part and the shaft end of the shaft.

* * * * *